(12) United States Patent
Ye et al.

(10) Patent No.: US 11,381,151 B2
(45) Date of Patent: Jul. 5, 2022

(54) CIRCUIT WITH SLOPE SENSING FOR DRIVING SYNCHRONOUS RECTIFIER DEVICE

(71) Applicant: Chengdu Monolithic Power Systems Co., Ltd., Chengdu (CN)

(72) Inventors: Jiayou Ye, New Taipei (CN); Yuedong Chen, Chengdu (CN); Hui Li, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 53 days.

(21) Appl. No.: 17/113,214

(22) Filed: Dec. 7, 2020

(65) Prior Publication Data

US 2021/0175790 A1      Jun. 10, 2021

(30) Foreign Application Priority Data

Dec. 9, 2019   (CN) .......................... 201911247505.7

(51) Int. Cl.
| | |
|---|---|
| *H02M 1/08* | (2006.01) |
| *H02M 3/335* | (2006.01) |
| *H02M 1/00* | (2006.01) |
| *H02M 1/32* | (2007.01) |
| *H02M 1/34* | (2007.01) |
| *H02M 7/217* | (2006.01) |

(52) U.S. Cl.
CPC ........... *H02M 1/08* (2013.01); *H02M 1/0006* (2021.05); *H02M 1/32* (2013.01); *H02M 3/33592* (2013.01); *H02M 1/0009* (2021.05); *H02M 1/0012* (2021.05); *H02M 1/0029* (2021.05); *H02M 1/0038* (2021.05); *H02M 1/0054* (2021.05); *H02M 1/344* (2021.05); *H02M 7/217* (2013.01)

(58) Field of Classification Search
CPC .... H02M 1/08; H02M 1/0006; H02M 1/0029; H02M 1/0038; H02M 3/33592; H02M 7/217

See application file for complete search history.

(56) References Cited

U.S. PATENT DOCUMENTS

| | | | | |
|---|---|---|---|---|
| 2019/0020282 A1* | 1/2019 | Li | ............................ | H02M 1/08 |
| 2020/0161985 A1* | 5/2020 | Li | ............................ | H02M 1/08 |
| 2021/0067026 A1* | 3/2021 | Tsai | ........................ | H02M 1/08 |

* cited by examiner

*Primary Examiner* — Kyle J Moody
*Assistant Examiner* — Jye-June Lee
(74) *Attorney, Agent, or Firm* — Perkins Coie LLP (57) ABSTRACT

A driving circuit for driving a synchronous rectifier device. The driving circuit may include a controllable charging circuit and a slope sensing circuit. The slope sensing circuit may sense whether an abrupt rising change in a voltage drop from a sensing terminal to a reference ground terminal of the driving circuit is occurring, and provide a slope sensing signal in response to a rising edge of the abrupt rising change in the voltage drop. The controllable charging circuit may receive the slope sensing signal and provide a charging current to a supply terminal of the driving circuit in response to each rising edge of the abrupt rising change in the voltage drop.

20 Claims, 4 Drawing Sheets

CIRCUIT WITH SLOPE SENSING FOR DRIVING SYNCHRONOUS RECTIFIER DEVICE

CROSS-REFERENCE TO RELATED APPLICATION(S)

This application claims the benefit of CN application No. 201911247505.7 filed on Dec. 9, 2019 and incorporated herein by reference.

TECHNICAL FIELD

This disclosure relates generally to electrical circuit, and more particularly but not exclusively relates to circuit for driving synchronous rectifier device.

BACKGROUND

Synchronous rectifier devices are widely used in various applications, for instance, configured as switching device at secondary side of isolated converters e.g. LLC resonant converter and flyback converter etc. During the operation of an isolated converter, each time when a primary switching device at its primary side is turned on to enable a current to flow through the primary winding of the isolated converter, an abrupt increase in a voltage drop on the synchronous rectifier device at the secondary side may be induced. For example, if a metal oxide semiconductor field effect transistor ("MOSFET") is used as the synchronous rectifier device, an abrupt increase in a drain to source voltage of the MOSFET may be induced due to turn on of the primary switching device at the primary side. For this situation, large overshoot voltage spike in the voltage drop on the synchronous rectifier device may occur and result in severe damage of circuit elements in the isolated converter etc. Using conventional RC snubber circuit to absorb such large overshoot voltage spike is neither economic nor efficient.

SUMMARY

In accomplishing the above and other objects, there has been provided, in accordance with an embodiment of the present invention, a driving circuit for driving a synchronous rectifier device. The driving circuit may comprise a controllable charging circuit, coupled between a sensing terminal and a supply terminal of the driving circuit, and configured to provide a charging current to the supply terminal in response to a slope sensing signal; and a slope sensing circuit, coupled between the sensing terminal and a reference ground terminal of the driving circuit, and configured to sense whether an abrupt rising change in a voltage drop from the sensing terminal to the reference ground terminal of the driving circuit is occurring, and further configured to provide the slope sensing signal in response to a rising edge of the abrupt rising change in the voltage drop.

In accordance with an embodiment, the slope sensing circuit may be configured to sense a voltage slew rate of the voltage drop, and to compare the voltage slew rate of the voltage drop with a predetermined slew rate threshold to provide the slope sensing signal when the voltage slew rate of the voltage drop is higher than the predetermined slew rate threshold.

In accordance with an embodiment, the controllable charging circuit may be configured to provide the charging current during a predetermined charging duration in response to a slope sensing signal.

In accordance with an embodiment, the controllable charging circuit may comprise: a charging current generation circuit, having a first terminal couple to the sensing terminal of the driving circuit and a second terminal coupled to the supply terminal of the driving circuit through a controllable switch; a charging duration timing circuit, configured to receive the slope sensing signal, and to generate a timing pulse of a charging timing signal in response to each abrupt rising change in the voltage drop from the sensing terminal to the reference ground terminal of the driving circuit, and wherein a pulse width of the timing pulse of the charging timing signal is indicative of a predetermined charging duration; and a controllable switch, having a control terminal configured to receive the charging timing signal, and wherein the controllable switch is on within the pulse width of each timing pulse of the charging timing signal.

In accordance with an embodiment, the slope sensing circuit may comprise: a voltage slew rate sensing circuit, coupled to the sensing terminal of the driving circuit and configured to generate a sensing current in response to transient change in the voltage drop from the sensing terminal to the reference ground terminal of the driving circuit; a current to voltage conversion circuit, coupled to an output terminal of the voltage slew rate sensing circuit to receive the sensing current and to convert the sensing current into a sensing voltage; and a comparison circuit, having a first terminal coupled to the output terminal of the current to voltage conversion circuit to receive the sensing voltage, and a second terminal coupled to receive a reference voltage, wherein the comparison circuit is configured to compare the sensing voltage with the reference voltage to provide the slope sensing signal.

In accordance with an embodiment, the voltage slew rate sensing circuit may comprise a capacitive element.

In accordance with an embodiment, the reference voltage may be indicative of a predetermined slew rate threshold.

In accordance with an embodiment, the sensing current has a current amplitude that is proportional to the slew rate of the voltage drop from the sensing terminal to the reference ground terminal of the driving circuit.

In accordance with an embodiment, the sensing voltage is proportional to the sensing current.

In accordance with an embodiment, when the sensing voltage is higher than or reaches the reference voltage, the slope sensing signal changes from a first logic state to a second logic state, and when the sensing voltage is lower than the reference voltage, the slope sensing signal changes from the second logic state to the first logic state, and the controllable charging circuit may be configured to provide the charging current in response to the second logic state of the slope sensing signal.

In accordance with an embodiment, the sensing voltage higher than or reaching the reference voltage indicates that the rising slew rate in the voltage drop is higher than a predetermined slew rate threshold, and that the slope sensing circuit has sensed that the abrupt rising change in the voltage drop is occurring.

In accordance with an embodiment, the current to voltage conversion circuit may be further configured to filter the sensing voltage to output the portion of the sensing voltage having positive phase.

In accordance with an embodiment, the current to voltage conversion circuit may comprise a resistive element, and wherein the sensing current flowing through the resistive element generates the sensing voltage.

In accordance with an embodiment, the current to voltage conversion circuit may further comprise a voltage clamping or rectifying circuit that is configured to clamp the sensing voltage at positive phase.

In accordance with an embodiment, the sensing terminal and the reference ground terminal of the driving circuit may respectively be coupled to a first terminal and a second terminal of the synchronous rectifier device, and the driving circuit may further comprise a driving terminal that is coupled to a control terminal of the synchronous rectifier device.

In accordance with an embodiment, the supply terminal of the driving circuit may be coupled to the reference ground terminal through a capacitive energy storage device.

In accordance with an embodiment, the driving circuit may further comprise: a logic control circuit, coupled to the supply terminal and configured to provide a control signal for controlling on and off switching of the synchronous rectifier device.

In accordance with an embodiment, the driving circuit may further comprise: a driver, coupled to the supply terminal and configured to enhance a driving capacity of the control signal to provide a driving signal to a control terminal of the synchronous rectifier device.

In accordance with an embodiment, the sensing terminal of the driving circuit may be coupled to an output terminal of an isolated converter, and the reference ground terminal may be coupled to a secondary winding of a transformer of the isolated converter. Or in accordance with an alternative embodiment, the sensing terminal of the driving circuit may be coupled to the secondary winding of the transformer of the isolated converter while the reference ground terminal may be coupled to the output terminal of the isolated converter.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of the embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
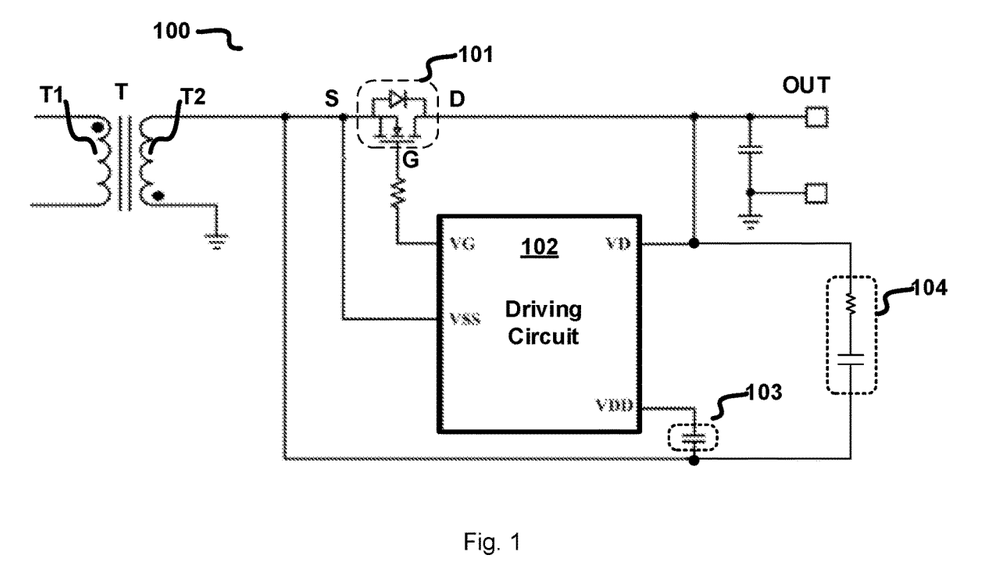
FIG. 1 illustrates a block diagram of a synchronous rectifying circuit 100 in accordance with an embodiment of the present invention.

FIG. 1 illustrates a block diagram of a synchronous rectifying circuit 100 in accordance with an embodiment of the present invention. The synchronous rectifying circuit 100 may comprise a synchronous rectifier device 101 and a driving circuit 102. The synchronous rectifier device 101 may be configured as a switching device at a secondary side of an isolated converter. For instance, in the example of FIG. 1, the synchronous rectifier device 101 may be controlled by the driving circuit 102. The driving circuit 102 may have a sensing terminal VD coupled to an output terminal OUT of the isolated converter, a reference ground terminal VSS coupled to a secondary winding T2 of a transformer T of the isolated converter, and a supply terminal VDD coupled to the reference ground terminal VSS via a capacitive energy storage device 103. In practical application, a voltage potential (also labeled with VSS) at the reference ground terminal VSS may be used as a reference ground potential VSS of the driving circuit 102 (including all the sub-circuits and elements that the driving circuit 102 may comprise). A first terminal D of the synchronous rectifier device 101 may be coupled to the sensing terminal VD of the driving circuit 102. A second terminal S of the synchronous rectifier device 101 may be coupled to the reference ground terminal VSS of the driving circuit 102. A control terminal G of the synchronous rectifier device 101 may be coupled to a driving terminal VG of the driving circuit 102. In accordance with alternative embodiments of the present invention, the supply terminal VDD may be coupled to the sensing terminal VD of the driving circuit 102 through a controllable charging circuit. The sensing terminal VD of the driving circuit 102 may be coupled to the first terminal D of the synchronous rectifier device 101 to sense/monitor a voltage potential (also denoted by VD) at the first terminal D of the synchronous rectifier device 101 and draw power, the voltage potential VD at the first terminal D of the synchronous rectifier device 101 taking the voltage potential VSS at the second terminal S of the synchronous rectifier device 101 as a reference potential. In other exemplary applications, the sensing terminal VD of the driving circuit 102 may be coupled to the secondary winding T2 of the transformer T of the isolated converter and the reference ground terminal VSS of the driving circuit 102 may be coupled to an output terminal OUT of the isolated converter. The synchronous rectifier device 101 may provide a current path from the first terminal D to the second terminal S when turned on and may switch the current path off when turned off.

Figure 2:
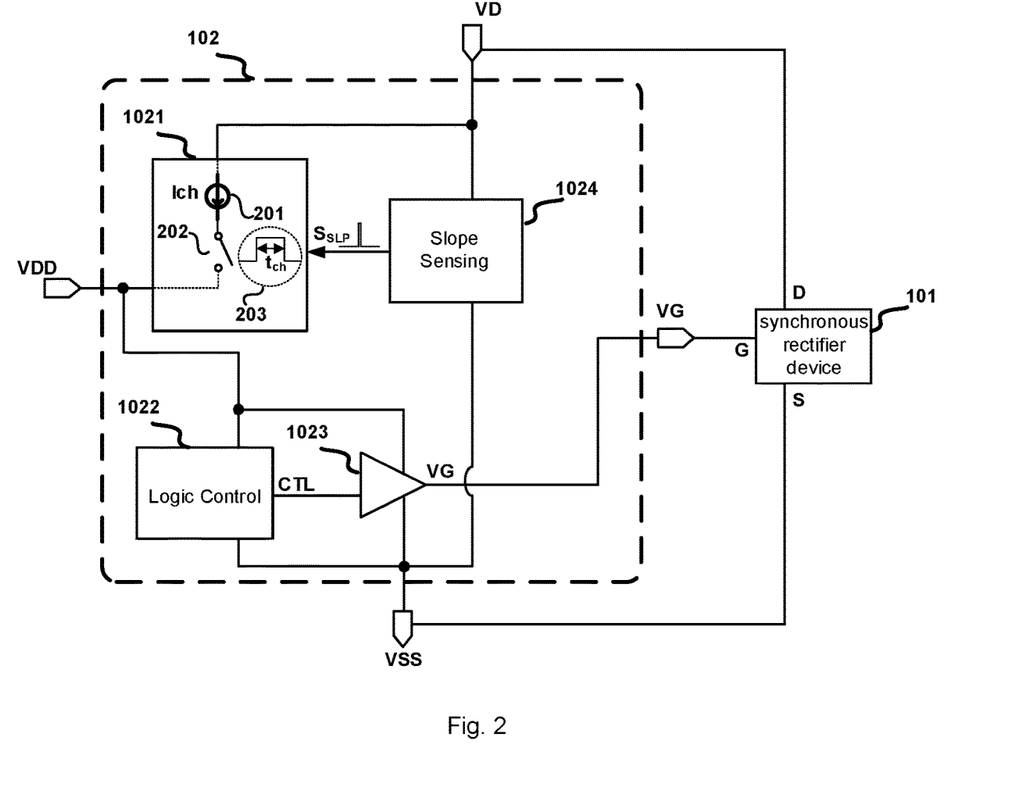
FIG. 2 illustrates a schematic diagram of a driving circuit 102 in accordance with an embodiment of the present invention.

FIG. 2 illustrates a schematic diagram of the driving circuit 102 in accordance with an embodiment of the present invention. The driving circuit 102 may comprise a controllable charging circuit 1021. The controllable charging circuit 1021 may be coupled between the sensing terminal VD of the driving circuit 102 and the supply terminal VDD of the driving circuit 102, and may be configured to provide a charging current Ich to the supply terminal VDD in response to a slope sensing signal $S_{SLP}$ to charge the capacitive energy storage device 103 to provide a supply potential VDD. For instance, in response to the slope sensing signal $S_{SLP}$, a current path may be formed in the charging circuit 1021 to provide the charging current Ich. In an embodiment, in response to the slope sensing signal $S_{SLP}$, the controllable charging circuit 1021 may be configured to provide the charging current Ich within a predetermined charging duration $t_{ch}$ to the supply terminal VDD. That is to say, in response to the slope sensing signal $S_{SLP}$, the controllable charging circuit 1021 may provide the charging current Ich during the predetermined charging duration $t_{ch}$ and stop providing the charging current Ich when the predetermined charging duration $t_{ch}$ elapsed. The supply potential VDD may be used as power supply to the driving circuit 102 (including all the sub-circuits and elements that the driving circuit 102 may comprise). The slope sensing signal $S_{SLP}$ may be indicative of an abrupt rising change in a voltage drop VDS from the sensing terminal VD of the driving circuit 102 to the reference ground terminal VSS of the driving circuit 102. The voltage drop VDS may also be referred to as a voltage potential difference between a voltage potential at the sensing terminal VD and the reference ground potential VSS at the reference ground terminal VSS of the driving circuit 102. In the exemplary embodiments shown in FIG. 1 and FIG. 2, since the sensing terminal VD and the reference ground terminal VSS of the driving circuit 102 are respectively coupled to the first terminal D and the second terminal S of the synchronous rectifier device 101, the slope sensing signal $S_{SLP}$ may be indicative of an abrupt rising change in a voltage drop (also labeled with VDS) on the synchronous rectifier device 101. The voltage drop VDS on the synchronous rectifier device 101 may refer to a voltage potential difference between the voltage potential VD at the first terminal D and the voltage potential VSS at the second terminal S of the synchronous rectifier device 101.

In accordance with an embodiment of the present invention, the driving circuit 102 may further comprise a slope sensing circuit 1024, coupled between the sensing terminal VD and the reference ground terminal VSS of the driving circuit 102. The slope sensing circuit 1024 may be configured to sense whether the voltage drop VDS from the sensing terminal VD to the reference ground terminal VSS of the driving circuit 102 is rising abruptly (or in other words, to sense whether abrupt rising change in the voltage drop VDS from the sensing terminal VD to the reference ground terminal VSS of the driving circuit 102 is occurring). In practical applications, referring to illustrations in FIG. 1 and FIG. 2, when the sensing terminal VD and the reference ground terminal VSS of the driving circuit 102 are respectively coupled to the first terminal D and the second terminal S of the synchronous rectifier device 101, the slope sensing circuit 1024 may generally be configured to sense whether the voltage drop VDS on the synchronous rectifier device 101 is rising abruptly (or in other words, to sense whether abrupt rising change in the voltage drop VDS on the synchronous rectifier device 101 is occurring). For instance, in the isolated converter application shown in FIG. 1, the synchronous rectifier device 101 is used as a switching device to switch on and off at the secondary side of the isolated converter. Each time the primary side switching device of the isolated converter is turned on, a current path is formed at the primary side of the isolated converter, and the potential difference VDS between the first terminal D and the second terminal S of the synchronous rectification device 101 will increase/rise sharply (for example, within tens of nanoseconds, it will rapidly rise from the reference ground potential to 80V) due to mutual inductance on the secondary side, that is, an abrupt rising change in the voltage drop VDS is occurring. The slope sensing circuit 1024 may be configured to sense this abrupt rising change in the potential difference VDS between the first terminal D and the second terminal S of the synchronous rectification device 101, and provide the slope sensing signal $S_{SLP}$ in response to the rising edge of the abrupt rising change. The slope sensing signal $S_{SLP}$ may be, for example, a narrow pulse signal. In this way, each time the primary side switching device is switched from off to on, the slope sensing circuit 1024 may sense the rising edge of the abrupt rising change in the potential difference VDS between the first terminal D and the second terminal S of the synchronous rectifier device 101 coupled to the secondary side and generate a narrow pulse signal $S_{SLP}$. The controllable charging circuit 1021 may be configure to receive the slope sensing signal $S_{SLP}$ and trigger the predetermined charging duration $t_{ch}$ in response to each narrow pulse of the slope sensing signal $S_{SLP}$. Therefore, each time an abrupt rising change in the voltage drop VDS from the sensing terminal VD to the reference ground terminal VSS of the driving circuit 102 (i.e. the voltage drop VDS on the synchronous rectifier device 101) occurs, the controllable charging circuit 1021 may connect the sensing terminal VD of the driving circuit 102 to the supply terminal VDD of the driving circuit 102 in response to the narrow pulse of the slope sensing signal $S_{SLP}$ to charge the capacitive energy storage device 103 within the predetermined charging duration $t_{ch}$. In this fashion, each time an abrupt rising change in the voltage drop VDS on the synchronous rectifier device 101 occurs, energy of the overshoot voltage spike in the voltage drop VDS may be absorbed by the capacitive energy storage device 103 and converted to the supply potential VDD for supplying the driving circuit 102, which can not only effectively reject/reduce the overshoot voltage spike in the voltage drop VDS but also make good use of the energy in the overshoot voltage spike. With the driving circuit 102 in accordance with various embodiments of the present invention, additional RC snubber circuit conventionally used for absorbing the energy in the overshoot voltage spike in the voltage drop VDS may be omitted or at least reduced in size. The driving circuit 102 in accordance with various embodiments of the present invention when used for driving a synchronous rectifier device 101 in an isolated converter can thus not only reduce power consumption but also save cost and improve system power efficiency.

In accordance with an embodiment of the present invention, as shown in FIG. 2, the controllable charging circuit 1021 may comprise a charging current generation circuit 201, a controllable switch 202 and a charging duration timing circuit 203. The charging current generation circuit 201 may have a first terminal couple to the sensing terminal VD of the driving circuit 102 and a second terminal coupled to the supply terminal VDD of the driving circuit 102 through the controllable switch 202. The controllable switch 202 may have a control terminal coupled to an output terminal of the charging duration timing circuit 203 and configured to receive a charging timing signal (also labeled with $t_{ch}$ for simplicity) indicative of the predetermined charging duration $t_{ch}$. The charging duration timing circuit 203 may be configured to receive the slope sensing signal $S_{SLP}$, and to generate a timing pulse of the charging timing signal ($t_{ch}$) in response to each occurrence of the abrupt rising change in the voltage drop VDS from the sensing terminal VD to the reference ground terminal VSS of the driving circuit 102, a pulse width of the timing pulse of the charging timing signal may be indicative of the predetermined charging duration $t_{ch}$. In applications where the sensing terminal VD and the reference ground terminal VSS of the driving circuit 102 are respectively coupled to the first terminal D and the second terminal S of the synchronous rectifier device 101, each time when the synchronous rectifier device 101 is switched from on to off, the charging current generation circuit 201 may generate the charging current Ich based on or by utilizing the voltage drop VDS from the sensing terminal VD to the reference ground terminal VSS of the driving circuit 102 (i.e. the voltage drop VDS from the first terminal D to the second terminal S of the synchronous rectifier device 101). The charging duration timing circuit 203 may accordingly control the controllable switch 202 to turn on (or to close) in response to each abrupt/sharp rising in the voltage drop VDS from the first terminal D to the second terminal S of the synchronous rectifier device 101 and keep the controllable switch 202 on during the predetermined charging duration $t_{ch}$ until the predetermined charging duration $t_{ch}$ terminates (that is the controllable switch 202 may be controlled to turn off/to open when the predetermined charging duration $t_{ch}$ terminates). Each time when the controllable switch 202 is close during the predetermined charging duration $t_{ch}$, a charging current path is formed from the sensing terminal VD to the supply terminal VDD to provide the charging current Ich to the supply terminal VDD to charge the capacitive energy storage device 103. One of ordinary skill in the art should understand that the charging current generation circuit 201, the controllable switch 202 and the charging duration timing circuit 203 and their configuration and connection in FIG. 2 are only illustrative and not intended to be limiting. The controllable charging circuit 1021 may comprise other circuits/elements, for instance, the charging current generation circuit 201 may be coupled to the sensing terminal VD through a high voltage sustaining circuit/element (e.g. a high voltage transistor having a breakdown voltage that is higher than a peak voltage value of the voltage potential VD at the sensing terminal VD), and in FIG. 2, this kind of coupling is illustrated by a dashed line from the charging current generation circuit 201 to the sensing terminal VD without specifically drawing the high voltage sustaining circuit/element out to avoid obscuring main disclosure of the present invention. For another example, a voltage regulating circuit (e.g. LDO) may further be coupled to the supply terminal VDD to regulate the supply potential VDD to other internal supply potential. These kinds of variations should be well known to one of ordinary skill in the art and do not go beyond the spirit and scope of the present invention.

Figure 3:
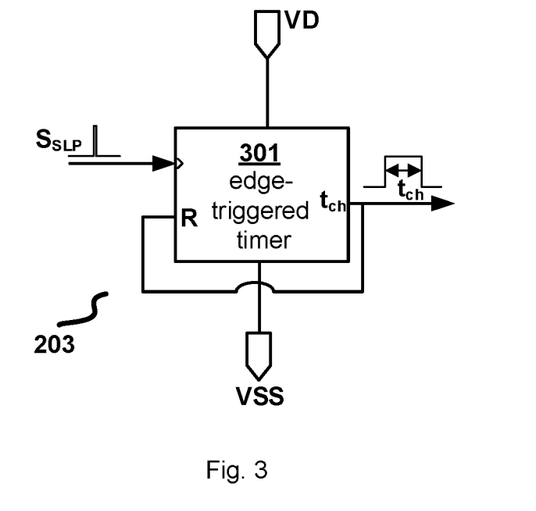
FIG. 3 illustrates a schematic diagram of a charging duration timing circuit 203 in accordance with an embodiment of the present invention.
Figure 4:
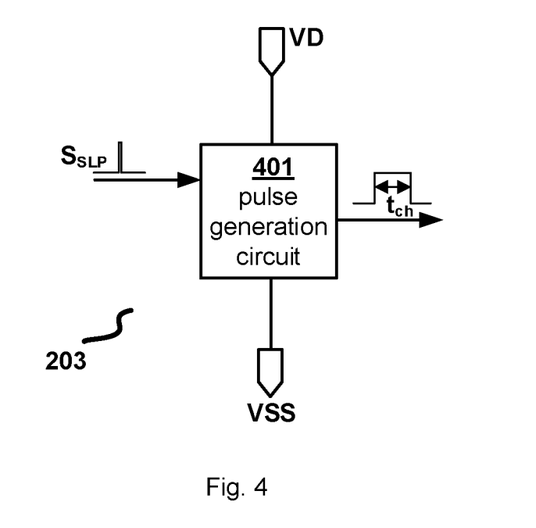
FIG. 4 illustrates a schematic diagram of a charging duration timing circuit 203 in accordance with an alternative embodiment of the present invention.

In accordance with an embodiment of the present invention, as shown in FIG. 3, the charging duration timing circuit 203 may comprise an edge-triggered timer 301. The edge-triggered timer 301 may be configured to receive the slope sensing signal $S_{SLP}$ and start timing the predetermined charging duration $t_{ch}$ in response to each narrow pulse of the slope sensing signal $S_{SLP}$ and to output the charging duration timing signal $t_{ch}$ when the predetermined charging duration $t_{ch}$ has been timed. The edge-triggered timer 301 may further be configured to reset (clear) the edge-triggered timer 301 to zero by the charging duration timing signal $t_{ch}$ every time the predetermined charging duration $t_{ch}$ has been timed. In accordance with an alternative embodiment, as shown in FIG. 4, the charging duration timing circuit 203 may comprise a pulse generation circuit 401, configured to receive the slope sensing signal $S_{SLP}$ and to generate a pulse signal having a pulse width equal to the predetermined charging duration $t_{ch}$ in response to each narrow pulse of the slope sensing signal $S_{SLP}$. The pulse signal having the pulse width equal to the predetermined charging duration $t_{ch}$ may be provided as the charging duration timing signal $t_{ch}$. Those of ordinary skill in the art should understand that the charging duration timing circuit 203 are not confined to those illustrated in FIG. 3 and FIG. 4 and may comprise or adopt other appropriate timing circuit or pulse generation circuit.

Figure 5:
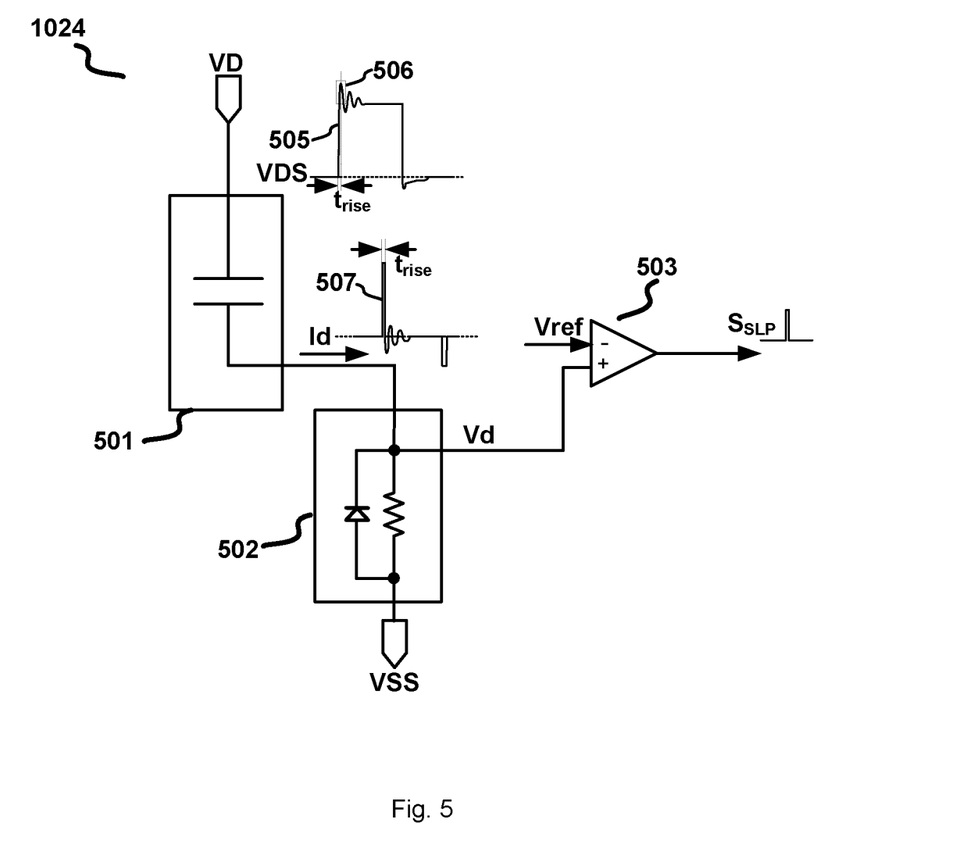
FIG. 5 illustrates a schematic diagram of a slope sensing circuit 1024 in accordance with an embodiment of the present invention.

In accordance with an embodiment of the present invention, as shown in FIG. 5, the slope sensing circuit 1024 may comprise a voltage slew rate (i.e. voltage changing rate dv/dt) sensing circuit 501, a current to voltage conversion circuit 502 and a comparison circuit 503. The voltage slew rate sensing circuit 501 may be coupled to the sensing terminal VD of the driving circuit 102 and may be configured to generate a sensing current Id in response to transient change in the voltage drop VDS from the sensing terminal VD to the reference ground terminal VSS of the driving circuit 102. The voltage slew rate sensing circuit 501 may comprise, for example in an embodiment, a capacitive element 5011 (e.g. a capacitor). The current to voltage conversion circuit 502 may be coupled to an output terminal of the voltage slew rate sensing circuit 501 to receive the sensing current Id and to convert the sensing current Id into a sensing voltage Vd. The comparison circuit 503 may have a first terminal (e.g. the "+" terminal in FIG. 5) coupled to the output terminal of the current to voltage conversion circuit 502 to receive the sensing voltage Vd, and a second terminal (e.g. the "−" terminal in FIG. 5) coupled to receive a reference voltage Vref. The comparison circuit 503 may be configured to compare the sensing voltage Vd with the reference voltage Vref to provide the slope sensing signal $S_{SLP}$. The reference voltage Vref may be indicative of a predetermined slew rate threshold. In applications where the sensing terminal VD and the reference ground terminal VSS of the driving circuit 102 are respectively coupled to the first terminal D and the second terminal S of the synchronous rectifier device 101, each time when the voltage drop VDS from the first terminal D to the second terminal S of the synchronous rectifier device 101 rising sharply/abruptly due to turn on of the current path at the primary side of the isolated converter, an abrupt rising edge and a large voltage spike present. FIG. 5 also illustrates out the waveforms of the voltage drop VDS and the sensing current Id during the transient change in the voltage drop VDS. As can be seen, each time the current path at the primary side of the isolated converter is on, it causes the voltage drop VDS to rise with a sharp/abrupt rising edge 505 following with oscillation spikes/ripples which finally subside. The first (also the largest) voltage spike in the voltage drop VDS is marked out with the dashed frame 506 to help better understand the embodiment. The voltage slew rate sensing circuit 501 senses the transient change in the voltage drop VDS and generates the sensing current Id, the sensing current Id may have a current amplitude that is proportional (e.g. with a proportional coefficient) to the slew rate/changing rate of the voltage drop VDS from the first terminal D to the second terminal S of the synchronous rectifier device 101, the proportional coefficient may be determined by the capacitance of the capacitive element 5011 in the voltage slew rate sensing circuit 501. That is to say, the current amplitude of the sensing current Id may increase with increase in the slew rate/changing rate of the voltage drop VDS and may decrease with decrease in the slew rate/changing rate of the voltage drop VDS. Therefore, when the sharp/abrupt rising edge 505 in the voltage drop VDS generates, a current pulse 507 generates correspondingly in the sensing current Id, amplitude of the current pulse 507 is proportional to the slew rate/changing rate of the voltage drop VDS at the sharp/abrupt rising edge 505 of the voltage drop VDS, and pulse width of the current pulse 507 is equal to a time duration $t_{rise}$ that the sharp/abrupt rising edge 505 lasts. The sensing current Id may be converted to the sensing voltage Vd that is proportional to the sensing current Id through the current to voltage conversion circuit 502. For example, in an embodiment, the current to voltage conversion circuit 502 may comprise a resistive element 5021, wherein the sensing current flowing through the resistive element 5021 may generate the sensing voltage Vd. In an embodiment, the current to voltage conversion circuit 502 may further be configured to filter the sensing voltage Vd to filter out a portion of the sensing voltage Vd having negative phase and output the portion of the sensing voltage Vd having positive phase. For instance, the current to voltage conversion circuit 502 may further comprise a voltage clamping or rectifying circuit 5022 (e.g. illustrated as a diode in FIG. 5), the voltage clamping or rectifying circuit 5022 may be configured to clamp the sensing voltage Vd at positive phase. The sensing voltage Vd may be compared with the reference voltage Vref (indicative of a predetermined voltage slew rate/changing rate) by the comparison circuit 503 to output the slope sensing signal $S_{SLP}$. When the sensing voltage Vd is higher than the reference voltage Vref, the slope sensing signal $S_{SLP}$ may change from a first logic state (e.g. a logic low) to a second logic state (e.g. a logic high). Since the sensing voltage Vd actually is indicative of the slew rate/changing rate in the voltage drop VDS, the sensing voltage Vd going higher than the reference voltage Vref (i.e. the slope sensing signal $S_{SLP}$ changing from the first logic state to the second logic state) actually indicates that the rising slew rate/changing rate in the voltage drop VDS is higher than the predetermined slew rate threshold, and thus indicating that the slope sensing circuit 1024 has determined/sensed that the abrupt rising change in the voltage drop VDS is occurring (i.e. the slope sensing circuit 1024 has sensed the sharp/abrupt rising edge 505). In the exemplary embodiment, the predetermined slew rate threshold may be appropriately set according to practical application requirements so that the slope sensing circuit 1024 can differentiate the sharp/abrupt rising edge 505 caused by turning on of the current path at the primary side of the isolated converter from rising change in the voltage drop VDS caused by other circumstances. In an embodiment, the second logic state of the slope sensing signal $S_{SLP}$ may trigger the controllable charging circuit 1021 to provide the charging current Ich during the predetermined charging duration $t_{ch}$ to the supply terminal VDD. The time duration $t_{rise}$ that the sharp/abrupt rising edge 505 lasts is quite short, and therefore the slope sensing signal $S_{SLP}$ may have a narrow pulse in response to each sharp/abrupt rising edge 505 of the voltage drop VDS from the first terminal D to the second terminal S of the synchronous rectifier device 101. In this fashion, the slope sensing circuit 1024 may accurately detect each sharp/abrupt rising edge 505 of the voltage drop VDS from the first terminal D to the second terminal S of the synchronous rectifier device 101 caused by turning on of the current path at the primary side of the isolated converter, and issue the narrow pulse having the second logic state of the slope sensing signal $S_{SLP}$ to control the controllable charging circuit 1021 to absorb the large voltage spike in the voltage drop VDS and convert it into the supply potential VDD.

In accordance with and embodiment of the present invention, turning back to FIG. 2, the driving circuit 102 may further comprise a logic control circuit 1022 and a driver 1023. The logic control circuit 1022 and the driver 1023 may be coupled to the supply terminal VDD of the driving circuit 102 to receive the supply potential VDD. The logic control circuit 1022 may be configured to provide a control signal CTL for controlling on and off switching of the synchronous rectifier device 101. The driver 1023 may be configured to enhance the driving capacity of the control signal CTL to provide a driving signal (also labeled with VG) to the driving terminal VG (or to the control terminal G of the synchronous rectifier device 101).

The advantages of the various embodiments of the present invention are not confined to those described above. These and other advantages of the various embodiments of the present invention will become more apparent upon reading the whole detailed descriptions and studying the various figures of the drawings.

From the foregoing, it will be appreciated that specific embodiments of the present invention have been described herein for purposes of illustration, but that various modifications may be made without deviating from the technology. Many of the elements of one embodiment may be combined with other embodiments in addition to or in lieu of the elements of the other embodiments. Accordingly, the present invention is not limited except as by the appended claims.

What is claimed is:

1. A driving circuit for driving a synchronous rectifier device, comprising:
   a controllable charging circuit, coupled between a sensing terminal and a supply terminal of the driving circuit, and configured to provide a charging current to the supply terminal in response to a slope sensing signal; and
   a slope sensing circuit, coupled between the sensing terminal and a reference ground terminal of the driving circuit, and configured to sense whether an abrupt rising change in a voltage drop from the sensing terminal to the reference ground terminal of the driving circuit is occurring, and further configured to provide the slope sensing signal in response to a rising edge of the abrupt rising change in the voltage drop.

2. The driving circuit of claim 1, wherein
   the slope sensing circuit is configured to sense a voltage slew rate of the voltage drop, and to compare the voltage slew rate of the voltage drop with a predetermined slew rate threshold, and to provide the slope sensing signal when the voltage slew rate of the voltage drop is higher than or reaches the predetermined slew rate threshold.

3. The driving circuit of claim 1, wherein the controllable charging circuit is configured to provide the charging current during a predetermined charging duration in response to the slope sensing signal.

4. The driving circuit of claim 1, wherein the controllable charging circuit comprises:
- a charging current generation circuit, having a first terminal coupled to the sensing terminal of the driving circuit and a second terminal coupled to the supply terminal of the driving circuit through a controllable switch;
- a charging duration timing circuit, configured to receive the slope sensing signal, and to generate a timing pulse of a charging timing signal in response to each abrupt rising change in the voltage drop from the sensing terminal to the reference ground terminal of the driving circuit, and wherein a pulse width of the timing pulse of the charging timing signal is indicative of a predetermined charging duration; and
- the controllable switch, having a control terminal configured to receive the charging timing signal, and wherein the controllable switch is on within the pulse width of each timing pulse of the charging timing signal.

5. The driving circuit of claim 1, wherein the slope sensing circuit comprises:
- a voltage slew rate sensing circuit, coupled to the sensing terminal of the driving circuit and configured to generate a sensing current in response to transient change in the voltage drop from the sensing terminal to the reference ground terminal of the driving circuit;
- a current to voltage conversion circuit, coupled to an output terminal of the voltage slew rate sensing circuit to receive the sensing current and to convert the sensing current into a sensing voltage; and
- a comparison circuit, having a first terminal coupled to an output terminal of the current to voltage conversion circuit to receive the sensing voltage, and a second terminal coupled to receive a reference voltage, wherein the comparison circuit is configured to compare the sensing voltage with the reference voltage to provide the slope sensing signal.

6. The driving circuit of claim 5, wherein the voltage slew rate sensing circuit comprises a capacitive element.

7. The driving circuit of claim 5, wherein the reference voltage is indicative of a predetermined slew rate threshold.

8. The driving circuit of claim 5, wherein the sensing current has a current amplitude that is proportional to a slew rate of the voltage drop from the sensing terminal to the reference ground terminal of the driving circuit.

9. The driving circuit of claim 5, wherein the sensing voltage is proportional to the sensing current.

10. The driving circuit of claim 5, wherein when the sensing voltage is higher than or reaches the reference voltage, the slope sensing signal changes from a first logic state to a second logic state, and wherein when the sensing voltage is lower than the reference voltage, the slope sensing signal changes from the second logic state to the first logic state, and wherein the controllable charging circuit is configured to provide the charging current in response to the second logic state of the slope sensing signal.

11. The driving circuit of claim 5, wherein the sensing voltage being higher than or reaching the reference voltage indicates that a rising slew rate in the voltage drop is higher than a predetermined slew rate threshold, and that the slope sensing circuit has sensed that the abrupt rising change in the voltage drop is occurring.

12. The driving circuit of claim 5, wherein the current to voltage conversion circuit is further configured to filter the sensing voltage to output a portion of the sensing voltage having positive phase.

13. The driving circuit of claim 5, wherein the current to voltage conversion circuit comprises a resistive element, and wherein the sensing current flowing through the resistive element generates the sensing voltage.

14. The driving circuit of claim 13, wherein the current to voltage conversion circuit further comprises a voltage clamping or rectifying circuit that is configured to clamp the sensing voltage at a positive phase.

15. The driving circuit of claim 1, wherein the sensing terminal and the reference ground terminal of the driving circuit are respectively coupled to a first terminal and a second terminal of the synchronous rectifier device, and wherein the driving circuit further comprises a driving terminal that is coupled to a control terminal of the synchronous rectifier device.

16. The driving circuit of claim 1, wherein the supply terminal is coupled to the reference ground terminal through a capacitive energy storage device.

17. The driving circuit of claim 1, further comprising:
- a logic control circuit, coupled to the supply terminal and configured to provide a control signal for controlling on and off switching of the synchronous rectifier device.

18. The driving circuit of claim 17, further comprising:
- a driver, coupled to the supply terminal and configured to enhance a driving capacity of the control signal to provide a driving signal to a control terminal of the synchronous rectifier device.

19. The driving circuit of claim 1, wherein the sensing terminal is coupled to an output terminal of an isolated converter, and wherein the reference ground terminal is coupled to a secondary winding of a transformer of the isolated converter.

20. The driving circuit of claim 1, wherein the sensing terminal is coupled to a secondary winding of a transformer of an isolated converter, and wherein the reference ground terminal is coupled to an output terminal of the isolated converter.

* * * * *